Patented June 12, 1951

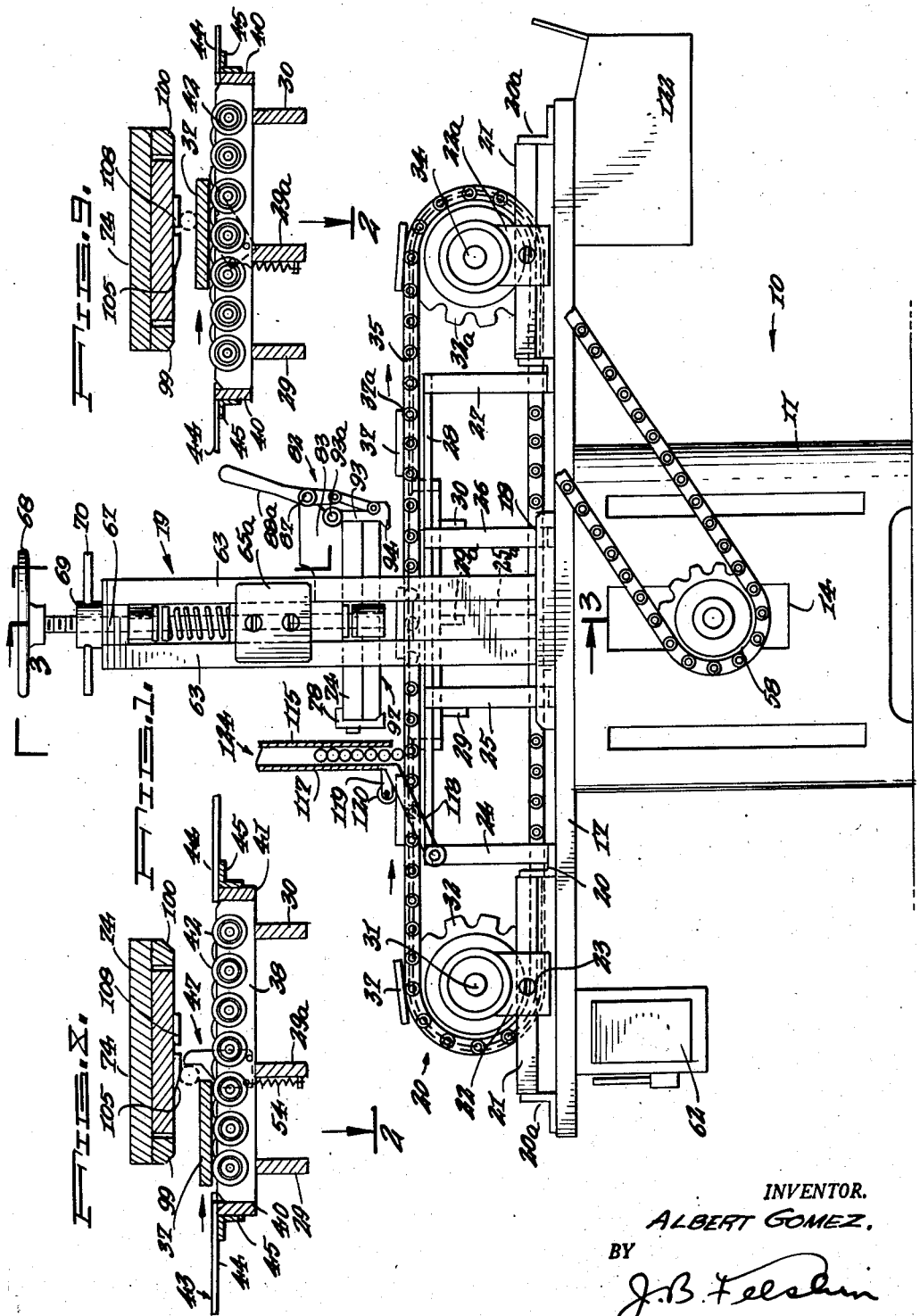

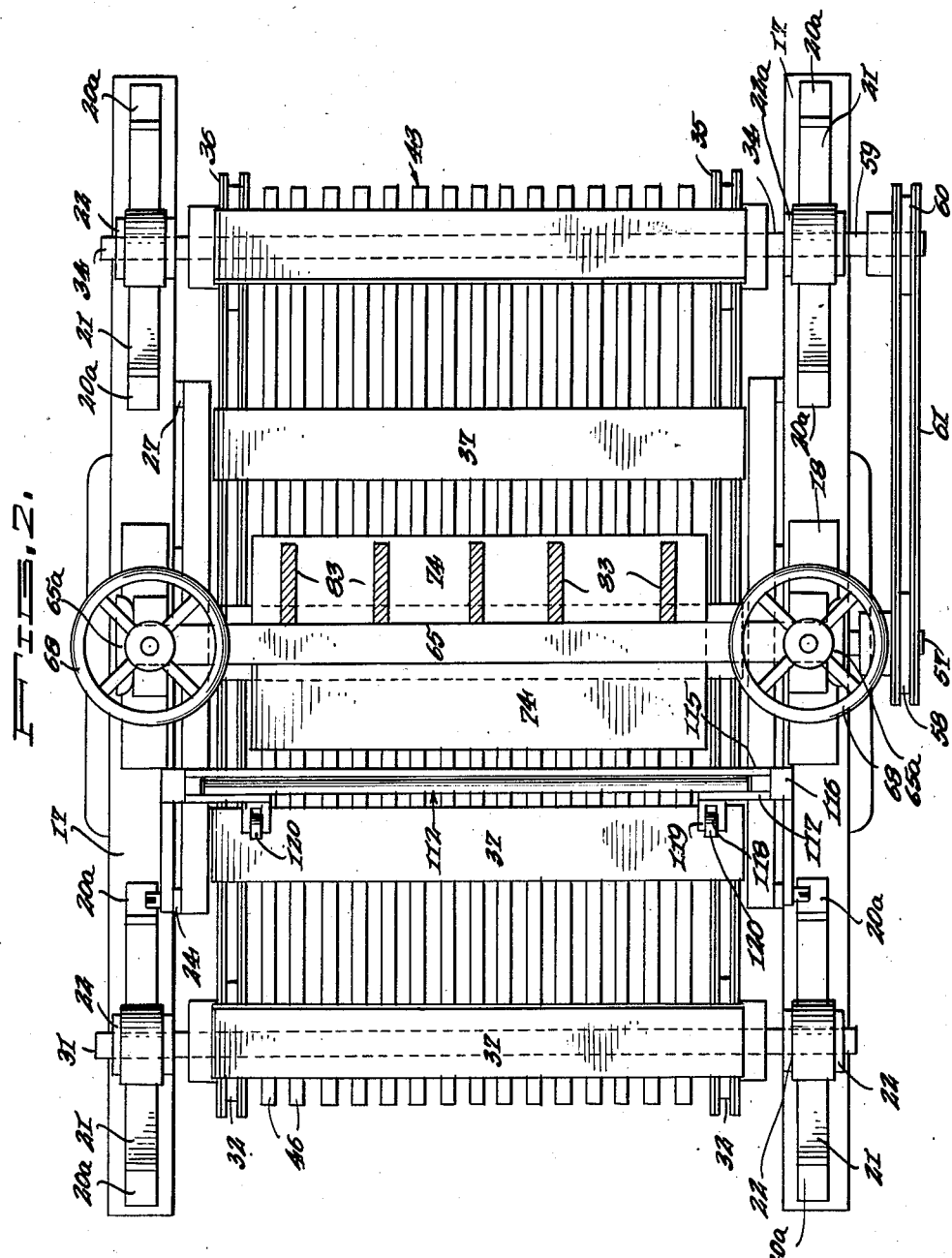

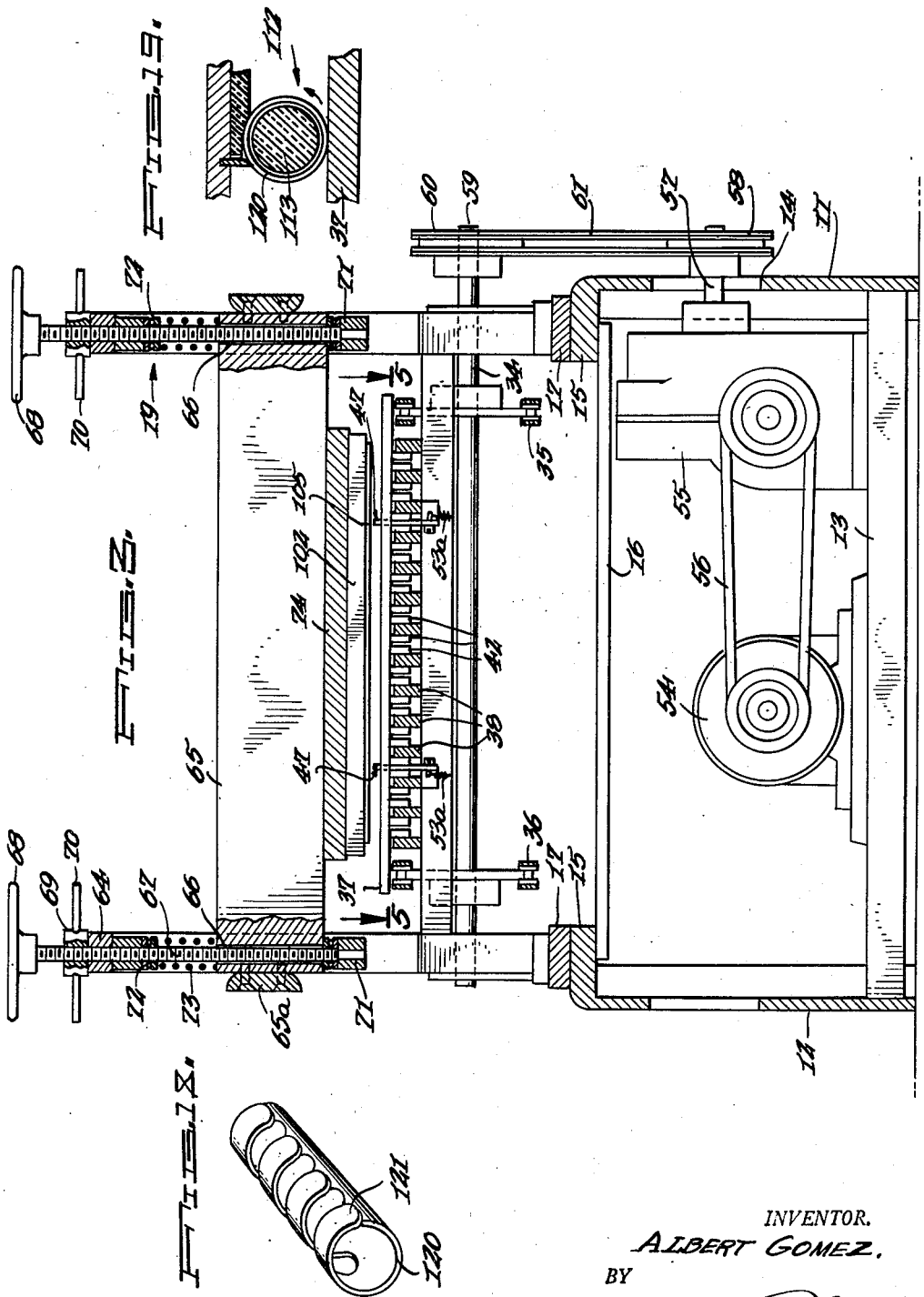

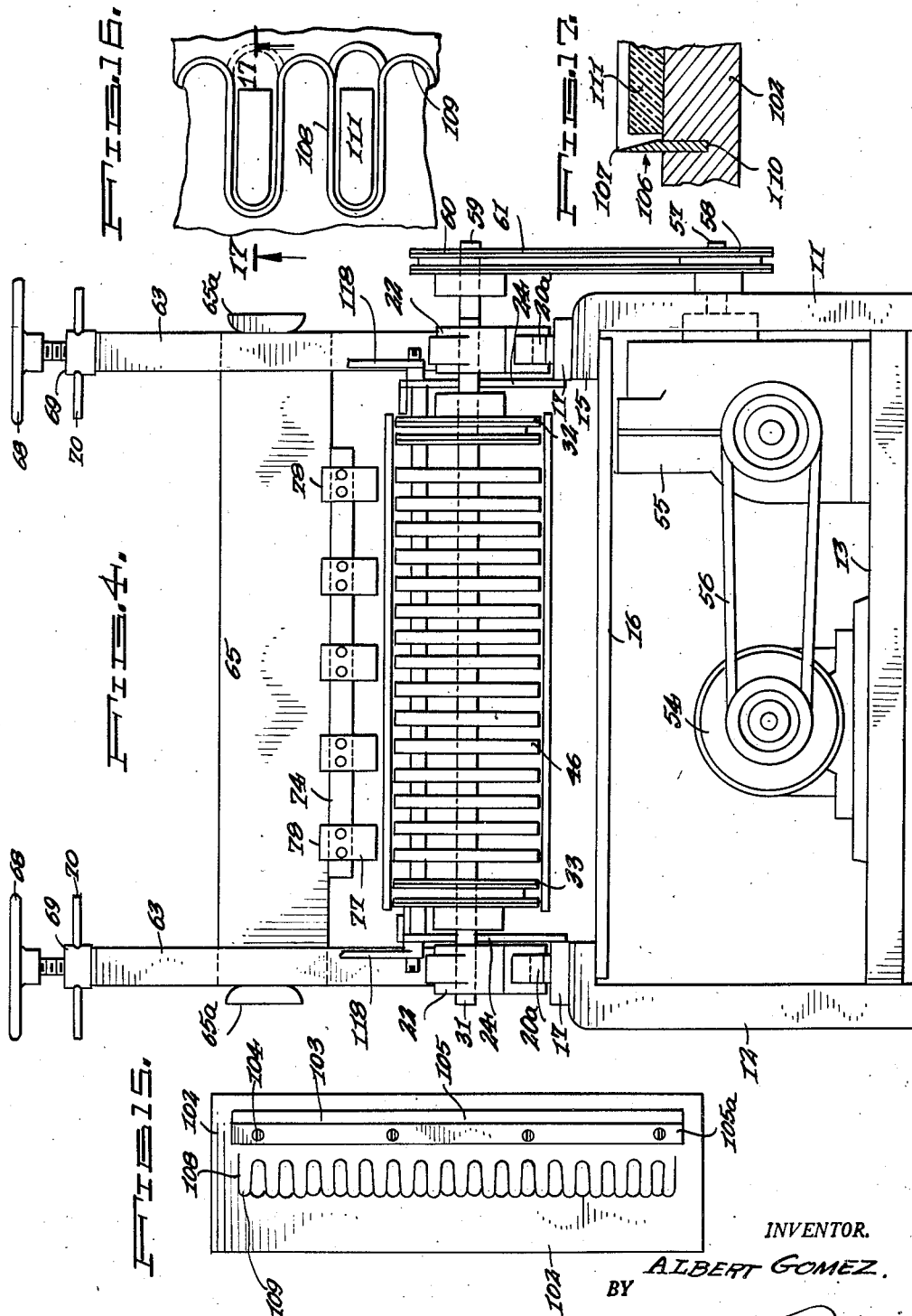

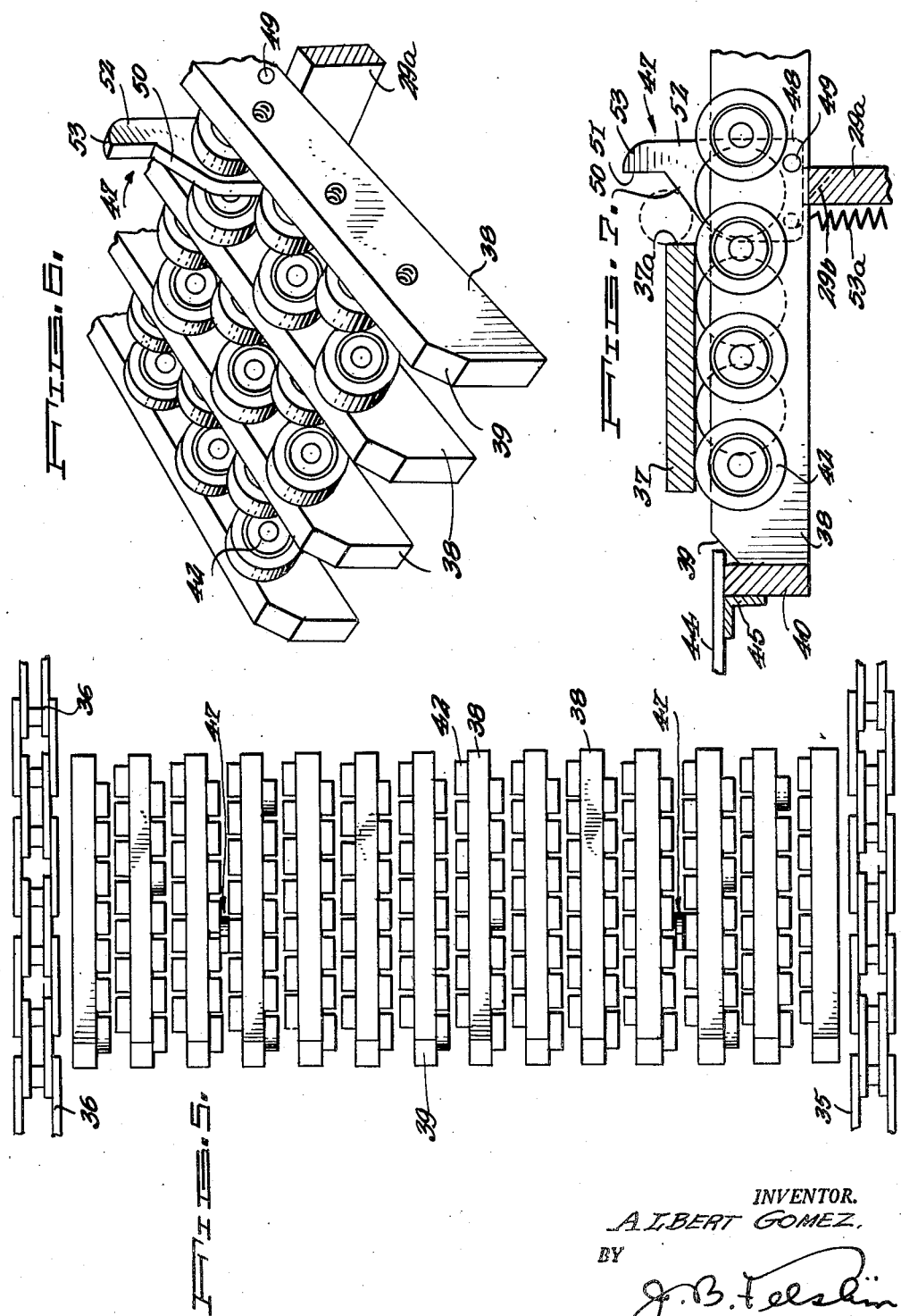

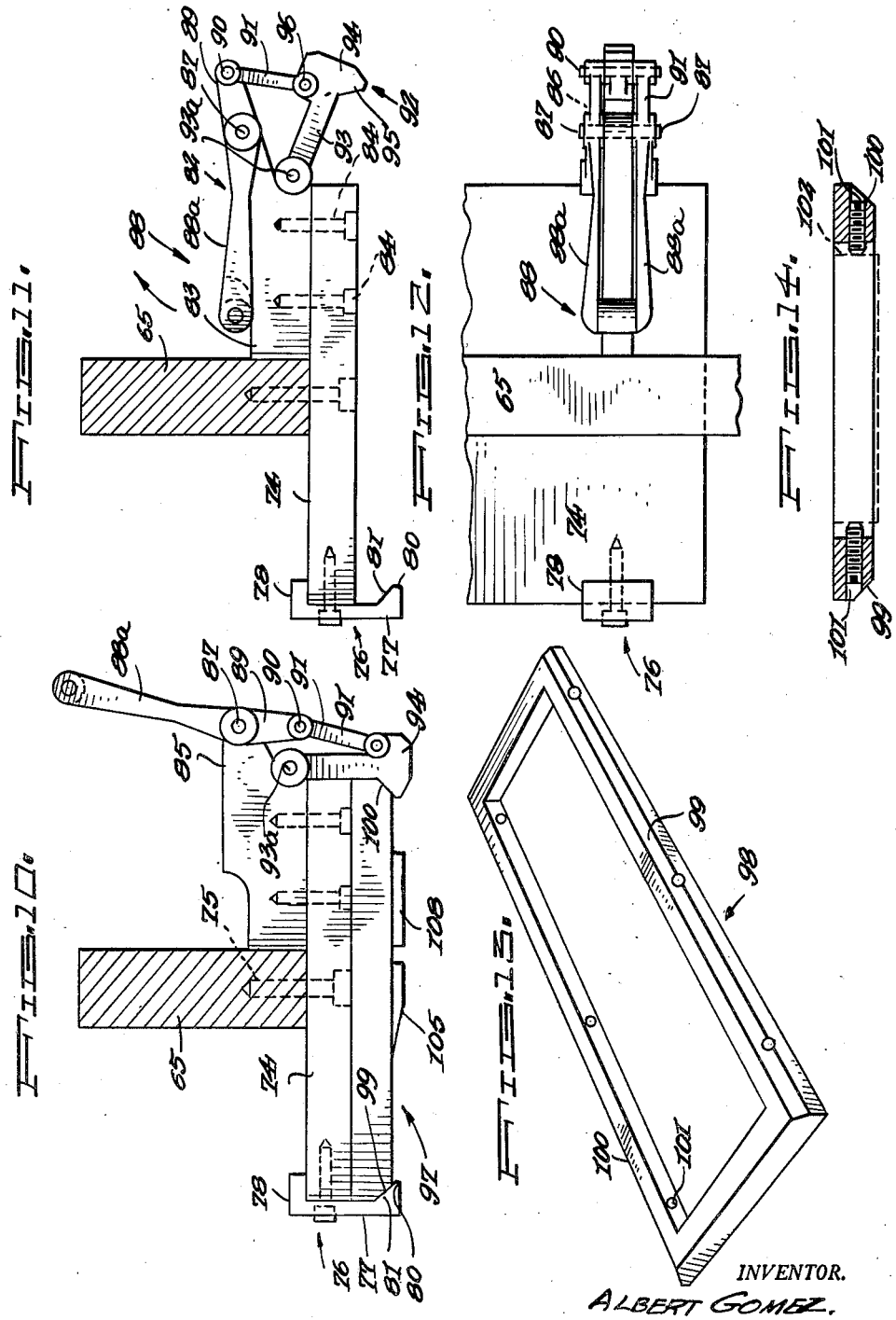

2,556,965

UNITED STATES PATENT OFFICE 2,556,965

METHOD AND DEVICE FOR CUTTING SELECTED CIRCUMFERENTIAL PORTIONS OF TUBULAR OR CYLINDRICAL OBJECTS

Albert Gomez, Whitestone, N. Y., assignor to Freundlich-Gomez Machinery Corp., Flushing, N. Y.

Application May 10, 1947, Serial No. 747,184

13 Claims. (Cl. 164—39)

1

This invention relates to a method and device for cutting selected circumferential portions of tubular or cylindrical objects. More particularly it relates to a device for making tubular plastic bindings which comprise a backbone portion and fingers extending therefrom.

An object of this invention is to provide a device for forming a tubular plastic book binder of the type which includes a backbone portion and integral fingers extending therefrom, including means for propelling a tubular blank towards a fixed cutting die having a planar cutting edge of a predetermined pattern, means for elevating the blank into a position between the cutting edge of the die and a supporting surface and means for imparting combined rotation and translatory movement to said blank while in contact with said die whereby the blank is cut circumferentially to produce the desired binding structure.

A further object of this invention is to provide in a device of the character described means for moving a tubular plastic member towards a fixed cutting die and coacting means adjacent said cutting die for causing the tubular member to rotate as it comes into contact with the cutting die whereby the member is so cut as to form a backbone portion and fingers extending therefrom.

Another object of this invention is to provide in a device of the character described, a conveyor, spaced supporting members on said conveyor, a cutting die mounted over said conveyor and pivoted means in the path of said supporting members and adjacent said die whereby a tubular plastic member placed on the conveyor will be caused to rotate while positioned between the moving supporting member and the cutting die.

Yet another object of this invention is to provide in a device of the character described a pair of parallel endless conveyor chains interconnected at spaced intervals by transversely extending supporting members, a cutting die positioned over the path of the supporting members, a pair of pivoted members supported in the path of said supporting members and adapted to be moved downwardly out of the path of said supporting members upon contact with said supporting members.

Still another object of this invention is to provide a device of the character described, a slidably mounted cutting die support, means on said support to releasably grip a die frame and means on said frame for holding a selected cutting die.

Still a further object of this invention is to

2 provide in a device of the character described, a fixed cutting die for cutting a predetermined pattern in a tubular blank supported on a moving surface and means adjacent said die adapted to coact with said moving surface to produce rotation of said blank while in contact with said cutting die.

Yet another object of this invention is to provide in a device of the character described, a pivoted magazine for feeding blanks to a travelling together with means on said conveyor for periodically elevating the magazine from the conveyor a distance sufficient to permit a single blank to pass from the lower open end of the magazine to the conveyor.

Yet a further object of this invention is to provide a strong, compact device for making tubular plastic binders, of the character described, which is relatively inexpensive to manufacture, which is easily operated and yet is highly efficient and practical in use.

Other objects of this invention will in part be obvious and in part hereinafter pointed out.

The invention accordingly consists in the features of construction, combinations of elements, and arrangements of parts which will be exemplified in the construction hereinafter described, and of which the scope of application will be indicated in the following claims.

In the accompanying drawing, in which is shown one of the possible illustrative embodiments of the invention, Fig. 1 is a front elevational view of the device embodying the invention;

Fig. 2 is a view taken in the plane 2—2 of Fig. 1;

Fig. 3 is a cross-sectional view taken on the line 3—3 of Fig. 1;

Fig. 4 in an end view of the device embodying the invention;

Fig. 5 is a view taken in the plane 5—5 of Fig. 3;

Fig. 6 is a perspective view of the roller support for the conveyor portion of the device embodying the invention;

Fig. 7 is a front elevational view showing the tubular member to be die cut, positioned between a supporting member and a pivoted member;

Fig. 8 is a view similar to that shown in Fig. 7 with the supporting member further advanced toward the pivoted member;

Fig. 9 is a view similar to that shown in Fig. 7 with supporting member in a position where it has moved the pivoted member out of its path;

Fig. 10 is an elevational view of the die block retainer portion of the device embodying the invention;

Fig. 11 is a view similar to that shown in Fig. 10 with pivoted gripping members on the retainer in a retracted position;

Fig. 12 is a top plan view of the die block retaining portion shown in Fig. 10;

Fig. 13 is a perspective view of the die block frame which is gripped in the die block retainer;

Fig. 14 is a sectional view of the frame shown in Fig. 13;

Fig. 15 is a bottom plan view of the die block;

Fig. 16 is an enlarged view of the details of the die block shown in Fig. 15;

Fig. 17 is a cross-sectional view taken on the line 17—17 of Fig. 16;

Fig. 18 is a perspective view of the tubular plastic binder formed by the device embodying the invention and Fig. 19 is a cross-sectional view showing the tubular blank being cut by the cutting die.

Referring now in detail to the drawing, 10 designates a device embodying the invention which has for its purpose the cutting of a tubular plastic blank in a manner to form a tubular binding having a backbone portion and fingers extending therefrom. The same comprises a pair of spaced, upstanding supports 11, 12 which are interconnected at their bottom portions by a member 13. The supports 11, 12 are formed with centrally located through openings 14 and comprise inwardly turned horizontally extending flange portions 15 at the upper ends thereof. The flange portions 15 of the supports 11, 12 are interconnected by a cross member 16. Elongated rectangular members 17 are secured to the upper faces of the flange portions 15, with the end portions thereof projecting on each side of the supports 11, 12. Base members 18 are secured to the upper faces of the elongated members 17 on centrally located portions thereof. Extending upwardly from the base members 18 are a pair of opposed guide members 19, for the purpose hereinafter appearing.

A conveyor 20 is positioned on the elongated members 17. The conveyor 20 comprises pairs of spaced angle members 20a mounted on each end of the elongated members 17. The members 20a are interconnected by a bar 21. Slidably mounted on the bars 21 are bearing members 22, 22a which may be fixed in any desired position on the bars by means of set screws 23. Extending upwardly from each of the elongated members 17 are spaced uprights 24, 25, 25a, 26 and 27. The uprights are interconnected at their upper ends by a horizontal member 28 extending parallel to the elongated member 17. The opposed uprights 25 and 26 are interconnected by members 29, 30 extending transversely of the members 17 and which are disposed below the upper ends of the uprights. A transverse member 29a disposed between members 29 and 30 is secured to uprights 25a.

Journaled in bearing members 22 is a transverse shaft 31. Fixed on the shaft 31 are sprocket wheels 32, 33 disposed adjacent the inner sides of the bearing members 22. Journaled in bearing members 22a is a transverse shaft 34 having secured thereon sprocket wheels 32a, 33a which are disposed adjacent the inner sides of the bearing members 22a. The sprocket wheels 32, 32a are interconnected by a sprocket chain 35 and similarly, sprocket wheels 33, 33a are interconnected by a sprocket chain 36. The chains 35, 36 are tensioned longitudinally by moving the bearing members 22, 22a on the bars 21 away from each other as far as possible and fixing the position of the members by means of the set screws 23.

A plurality of spaced elongated, rectangular shaped members or bars 37 are removably secured at their end portions on sprocket chains 35, 36 by means of screws or the like. The bars 37 comprise forward edges 37a and extend transversely of the chains. Means is provided for supporting the members 37 as they move on the sprocket chains 35, 36 through a central portion of the device. To this end a plurality of longitudinally extending spaced bars 38 are mounted on the transverse members 29, 29a and 30. The bars 38 extend between, and are parallel to, the upper run of chains 35, 36 and comprise beveled rear end portions 39. The ends of the bars 38 are interconnected by transverse members 40, 41. A plurality of rollers 42 in ball bearing mountings are journalled on each side of each of the bars 38 in longitudinally spaced relationship, with the periphery of the rollers projecting slightly above the upper edge of the bars. The rollers 42 on one bar are disposed in staggered relation to the rollers on an adjacent bar. As shown in Figs. 5 and 6, the bars 38 are spaced to permit free rotation of the rollers 42. The projecting peripheral portions of the rollers 42 support the members 37 by contact with the lower surfaces thereof.

Extending from the transverse members 40, 41 are a plurality of spaced slat like members 43, disposed parallel to, and between the chains 35, 36. The slat like members 43 form a surface slightly below the level of the peripheral portions of the adjacent rollers 42. The members 43 comprise horizontal portions 44 secured at their inner ends to the transverse members 40, 41 by means of angle members 45. The outer ends of portions 44 extend towards the shafts 31 and 34. Extending from the horizontal portions 44 are semi-circular portions 46, passing around the shafts 31, 34. Extending from the lower end of portions 46 are horizontal portions parallel to the horizontal portions 44 and disposed between the lower runs of the sprocket chains 35, 36.

Pivotally mounted between bars 38 and over transverse members 29a, are a pair of aligned members 47 for the purpose hereinafter appearing. The members 47 comprise a rectangular body portion 48 with the lower outer corner portion mounted on a pivot pin 49 journalled in a pair of adjacent bars 38. The upper portion of the members 47 comprise on their inner sides an upwardly and outwardly inclined edge 50 from which extends a vertical edge 51. The outer side of the members 47 comprise a vertical edge 52 having an upper rounded corner 53 merging with the vertical edge 51. The members 47 are in laterally aligned relationship and have their lower inner corner portions resiliently connected to the transverse member 29a by means of coil springs 53a.

A motor 54 is mounted on the member 13 and is interconnected to a speed reducing device 55 by means of a belt 56. The output shaft 57 of the speed reducing device projects through the opening 14 in support 11. A sprocket wheel 58 is mounted on the projecting portion of the shaft 57. The shaft 34 comprises an outwardly projecting portion 59 on which is mounted a sprocket wheel 60 aligned with sprocket wheel 58 and interconnected thereto by a sprocket chain 61. A starting switch 62 controlling the motor 54, is mounted on the end of one of the elongated members 17. It will be apparent that the motor 54 is adapted to impart rotation to the shaft 34 through the speed reducing device 55 and the interconnected sprocket wheels 58, 60. The rotating shaft 34 will cause movement of the endless sprocket chains 35, 36 mounted on sprocket wheels 32, 32a and 33, 33a. This in turn will move the spaced members 37 in a predetermined, endless path over the guide members 43 and the supporting rollers 42.

The opposed guide members 19 each comprise a pair of spaced, parallel members 63 extending upwardly from the base member 18 and which are interconnected at their upper ends by horizontal members 64. A vertically positioned, rectangular block 65 extends transversely of the bars 38 and has its end portions slidably mounted between the members 63. Rectangular members 65a, which span the members 63, are screwed to the ends of the block 65. The block 65 is formed with vertically extending through openings 66 at either end thereof. The block 65 is supported by screws 67 which are vertically mounted between the members 63 with their upper portions threaded in the horizontal members 64 and having hand wheels 68 fixed to their upper ends. Locking collars 69 on the screws 67 are disposed between the hand wheels 68 and the horizontal member 64. The locking collars 69 comprise radially extending pins 70 for rotating the collars. The lower ends of the screws 67 pass through the openings 66 in the block 65 which is supported on collars 71 screwed on the end portions of the screws. Internally threaded collars 72 are mounted on the screws 67, being disposed below and adjacent the horizontal members 64. Coil springs 73 are mounted on the screws 67, being disposed between the upper edge of the block 65 and the lower edge of the collars 72. It will be apparent that the block 65 is resiliently mounted for adjustable, slidable vertical movement on the guide members 19.

Means is provided for supporting a cutting die on the lower end of the block 65. To this end a horizontally extending rectangular plate 74 is secured to the lower edge of the block 65 by means of screws 75 or the like. The plate 74 projects on each side of the members 63. A plurality of securing brackets 76 are disposed in spaced relation along the rear edge of the plate 74 and are secured thereto by screws 77. The brackets 76 comprise a vertical portion 78 in contact with the rear vertical edge of plate 74, from which extends a horizontal portion 79 disposed in contact with the upper face of the plate. The lower end of the vertical portion 78 projects below the lower face of the plate 74 and terminates in an inwardly extending hook shaped portion 80 having an inclined edge 81. A plurality of releasable securing brackets 82 are disposed in spaced relation along the forward portion of the upper surface and the forward edge of the plate 74. The brackets 82 comprise a body portion 83 having its rear edge abutting the block 65 and its lower edge in contact with the upper surface of plate 74 with screws 84 securing the body to the plate. The body portion 83 comprises a projection 85 extending beyond the forward edge of the plate 74 and formed with a transverse opening 86. A pivot pin 87 is received in the opening 86. A bifurcated handle 88 having inner arm portions 88a disposed on either side of the projection 85 of the body 83 is pivotally mounted on the pin 87. Outer arm portions 89 of member 88 project beyond the end of the projection 85 and are interconnected by a pin 90 to which is pivotally attached one end of a link 91. The other end of the link 91 is pivotally attached to a gripping member 92. The gripping member 92 comprises an arm 93 pivotally attached at its inner end to a lower portion of body 83 on a pin 93a. Extending from the outer end of the arm 93 is an enlarged head 94 which comprises an inwardly and downwardly inclined edge 95. A pivot pin 96 on the head 94 opposite the inclined edge 95 is connected to link 91. Clockwise movement of the handle 88, about pin 87 will impart pivoted movement to the member 92 about the pin 93a through link 91. This will bring the inner edge of the arm 93 of member 92 into contact with the forward edge of the plate 74 in the position shown in Fig. 10.

A cutting die block 97 is releasably secured to the plate 74 by means of the fixed securing brackets 76 and the movable gripping members 92. The block 97 comprises a rectangular frame 98 having beveled lower edges 99, 100. The sides of the frame 98 are formed with transverse, threaded through openings 101. Set screws 102 screwed into openings 101 are adapted to bear against a rectangular plate 102 which fits within the frame 98. On the lower surface of the plate 102 and disposed adjacent the rear edge thereof elongated ramplike member 103 secured to the plate by means of screws 104. The member 103 comprises a surface 105 inclined toward the rear edge of the plate and from which extends a horizontal planar portion 105a. Also mounted on the lower surface of the plate 102 and in slightly spaced relation to the member 103, is a cutting die 106 having a planar cutting edge 107 which is substantially coplanar with the lower horizontal surface 105a of the member 103. As shown in Figs. 15 and 16, the cutting die 106 takes the form of a zig-zag structure having parallel portions 108 interconnected by loops 109. The lower end 110 of the die 106 is suitably fixed in the plate 102. Resilient blocks 111 of sponge rubber or the like, are disposed between the parallel portions 108 of the cutting die as shown in Fig. 16, for the purpose hereinafter described. The upper surface of the blocks 111 is slightly below the plane of the cutting edge 107 of the die 106. When the plate 102 is properly positioned on the block 65, the member 103 on the plate will be disposed over the pivoted member 47, as shown in Fig. 8.

Means is provided for automatically feeding a series of elongated tubular blanks 112 which have mandrels 113 disposed interiorly thereof. To this end, a magazine 124 open on its upper and lower ends for feeding the blanks 112 is mounted between the chains 35, 36. The magazine 124 comprises a vertically extending front wall 115, end walls 116 and rear wall sections 117 projecting inwardly from the rear portion of end walls 116 and disposed in parallel relation to the front wall 115. The dimensions of the magazine 124 are such as to accommodate a stack of blanks. A pair of arms 118 extend downwardly and rearwardly of the lower ends of walls 116. The outer ends of the arms 118 are pivoted on the upper ends of the uprights 24. Extending rearwardly from the lower ends of each of the wall sections 117 is a bifurcated bracket 119 disposed parallel to the slat like members 43. Rollers 120 are journalled in the outer ends of the brackets 119. Normally the lower end of the magazine 124 is in contact with the slat like members 43. The forward edge 37a of members 37, moving with chains 35, 36, engage the rollers 120 and on continued movement, elevate the magazine 124 a distance equal to the thickness of the member 37. This permits the lowermost blank 112 to be pushed forward by the edge 37a of the member 37. The upper surface of the member 37 seals the bottom portion of the magazine thereby preventing more than one blank from leaving the magazine at a time.

In operating the device embodying the invention, the cutting die block 97 which has been previously provided with the appropriate cutting die 106 secured therein, in the manner previously described, is positioned in contact with the plate 74. The block 97 is secured to the plate by means of the rearwardly disposed fixed retaining brackets 76 which engage the beveled rear edge 99 of the block and the forward brackets 82 which are pivoted into position by means of the handles 88 whereby the beveled front edge 100 of the block is gripped by the inclined edge 95 of the securing bracket 82. The toggle action of the link 91 and the arm 89 of handle 88 will lock the gripping member 92 into a position securely holding the block 97, in the position shown in Fig. 10. The block 65 together with the attached die block 97 is then properly positioned with respect to the rollers 42 by rotating the hand wheels 68 in the proper direction to either lower or raise the block 65 by means of the screws 67. When the block 65 is in its proper position, the collar 69 is turned by means of pins 70, to lock the screws 67 in the desired position.

A stack of blanks 112 together with the interiorly disposed mandrels 113, are initially placed in the magazine 124. The motor 54 is then started by means of switch 62, which starts the movement of the chains 35, 36 in the direction indicated by the arrows in Fig. 1. The forward movement of the members 37 on the chains 35, 36 initiates the feeding of the lowermost blank from the magazine 124 in a forward direction, in the manner previously described.

The member 37 in its continued forward movement propels or pushes the blank 112 over the slat like members 43 towards the upstanding pivoted members 47. Upon contact of the blank with the members 47, the inclined edge 50 thereof will direct the movement of the propelled blank in an upward direction towards the inclined portion 105 of the member 103 on die block 97. The upper edge 51 of the member 47 which projects above the upper surface of the members 37 directs the movement of the blanks 112 to a position on the upper surface of the member 37. Continued forward movement of the members 37 will have the effect of initially disposing the blank between the upper surface of the member 37 and the inclined or ramp portion 105 of the member 103. The movement of the member 37 will also cause rotation of the blank 112 in a counter-clockwise direction as well as its movement in a forward direction towards the horizontal planar portion 105a of the member 103. At this point the movement of the member 37 will cause rotation of the pivoted members 47 in a clockwise direction about the pin 49. The beveled portion 29b on the transverse member 29a receives the outer lower corner of the members 47 in their rotated position. This permits the members 37 to move forward unimpeded.

The member 37 will be positively supported by the rollers 42 as well as being urged in an upward direction towards the cutting die 106 thereby compressing the blank. The combined rotational and translatory movement of the blank 112 while supported on the member 37 will bring it into contact with the cutting edge 107 of the cutting die 106. The blank 112 being in compressed condition between the cutting die and the member 37, will have its wall cut in accordance with the pattern of the cutting die. The pattern shown in Figs. 15, 16 will produce the tubular binding shown in Fig. 18 which includes a backbone portion 120, and finger portions 121. The resilient blocks 111 between the cutting edges 107 are initially compressed between the plate 102 and the outer surface of the blank 112. Upon release of the pressure with continued movement of the blank and completion of the cutting operation, the expansion of the blocks will force the blank from the cutting edge 107 of the die.

The continued movement of the member 37 permits the members 47 to reassume their vertical position, being rotated in a counterclockwise direction about the pins 49 by the action of the springs 54 of Fig. 10. The next succeeding member 37 then propels another blank 112 from the magazine 124 towards the members 47 for repetition of the previously described operations.

The cut tubular blanks fall to the rear of the member 37 on which they were cut, rest on the rollers 42 until the forward edge 37a of the next succeeding member 37 moves it in a forward direction to the front end of the device where it falls into a receptacle 122 provided for the purpose and secured to the forward end of the elongated members 17.

The mandrels 113 used to internally support the blanks 112 may be made of wood or other suitable material which will not dull the cutting edge of the die 106. Where the rigidity of the material from which the blanks are made permits, the mandrels may be omitted.

The particular cutting die shown in Figs. 15, 16, 17 may be replaced by other dies of a design suitably developed to cut a desired pattern in the circumferential wall portion of the tubular blanks.

Tubular blanks as well as solid cylindrical objects made of plastic, paper, cardboard, metal or any other material adapted to be cut by the selected die, may be processed in the manner disclosed.

Pulley wheels and belts may be used in lieu of the sprocket wheels and sprocket chains as shown.

It will thus be seen that there is provided a device by which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. In a device for cutting a cylindrical object, comprising, a support for said object, a member movable over said support for pushing said object on said support at right angles to the axis of said object, a cutting die spaced from said support, means at the leading edge of the die for lifting the object onto said member whereby said member will roll said object against said die as said member continues to move, for cutting the surface of said object.

2. In a device for cutting a cylindrical object, comprising, a support for said object, a member movable over said support for pushing said object on said support at right angles to the axis of said object, a cutting die spaced from said support, means at the leading edge of the die for lifting the object onto said member whereby said member will roll said object against said die as said member continues to move, for cutting the surface of said object, said lifting means comprising a pivoted finger in the path of said member, said member being adapted to rotate said finger to bypass the same.

3. A device for cutting the wall of a tubular blank, comprising a conveyor, a cutting die disposed adjacent the conveyor, and a plurality of spaced members movable with said conveyor past said cutting die upon movement of said conveyor for rolling the blank against the die, and a pivoted finger disposed adjacent the leading end of said cutting die, said finger having means to lift said blank from a position at the leading edge of one of said members to a position between said member and said die.

4. A device for cutting the wall of a tubular blank, comprising a conveyor, a cutting die disposed adjacent the conveyor, and a plurality of spaced members movable with said conveyor past said cutting die upon movement of said conveyor for rolling the blank against the die, and a pivoted finger disposed adjacent the leading end of said cutting die, said finger having means to lift said blank from a position at the leading edge of one of said members to a position between said member and said die, and supporting means including spaced rollers disposed opposite said cutting die and adapted to contact said members in the course of their travel as they pass said cutting die.

5. In a device for cutting a cylindrical object, comprising, a support for said object, a member movable over said support for pushing said object on said support at right angles to the axis of said object, a cutting die spaced from said support, means at the leading edge of the die for lifting the object onto said member whereby said member will roll said object against said die as said member continues to move, for cutting the surface of said object, and means controlled by said member to deposit objects to be cut on said support.

6. A device for cutting the wall of a tubular blank comprising a frame, a conveyor on said frame, a cutting die slidably mounted on said frame, said cutting die being movable towards and away from said conveyor, a plurality of spaced base plates on said conveyor, means pivoted on said frame and successively engageable by said base plates, said pivoted means being disposed opposite said cutting die and in the path of said base plates said pivoted means comprising an inclined edge disposed toward the forward edge of said base plates and a finger portion projecting upwardly therefrom, said finger portion extending above the upper face of said base plates, said pivoted means being adapted to move out of the path of the base plates upon engagement by said base plates.

7. In a device for cutting surfaces of cylindrical objects, a support on which said objects may be transversely placed, a pair of wheels at each end of said support, the wheels of each pair being on opposite sides of said support, a belt over the pair of wheels at each side of the support, spaced bars attached at their ends to said belts and transversing said support and adapted to move thereover, a pair of upstanding guides on opposite sides of said belts, a die slidably mounted on said guides, said bars being adapted to move past said die and therebelow, the leading edges of said bars being adapted to push said objects on the support, along said support past said die, means adjacent the leading end of the die to lift said objects onto said bars so that said bars will roll said objects against said die, as said bars move past said die.

8. In a device for cutting surfaces of cylindrical objects, a support on which said objects may be transversely placed, a pair of wheels at each end of said support, the wheels of each pair being on opposite sides of said support, a belt over the pair of wheels at each side of the suport, spaced bars attached at their ends to said belts and transversing said support and adapted to move thereover, a pair of upstanding guides on opposite sides of said belts, a die slidably mounted on said guides, said bars being adapted to move past said die and therebelow, the leading edges of said bars being adapted to push said objects on the support, along said support past said die, means adjacent the leading end of the die to lift said objects onto said bars so that said bars will roll said objects against said die, as said bars move past said die, and means to deposit an object to be die cut on the support in front of each bar in advance of said die.

9. In a device for cutting surfaces of cylindrical objects, a support on which said objects may be transversely placed, a pair of wheels at each end of said support, the wheels of each pair being on opposite sides of said support, a belt over the pair of wheels at each side of the support, spaced bars attached at their ends to said belts and transversing said support and adapted to move thereover, a pair of upstanding guides on opposite sides of said belts, a die slidably mounted on said guides, said bars being adapted to move past said die and therebelow, the leading edges of said bars being adapted to push said objects on the support, along said support past said die, means adjacent the leading end of the die to lift said objects onto said bars so that said bars will roll said objects against said die, as said bars move past said die, and means to press said bars toward said die as said bars pass said die.

10. A method of making leaf binders comprising rolling a tube of plastic material, under pressure, in a direction at right angles to the tube, against a die having a longitudinal sinuous shaped blade having transverse portions interconnected at their ends and portions interconnecting spaced pairs of transverse portions adjacent one side of the blade, whereby to cut from said tube parallel spaced portions to form slots and fingers between said slots extending from one side of a backbone portion toward an opposite side of said backbone portion and with the outer ends of said fingers severed.

11. A method of making a leaf binder from a tube of plastic material comprising rolling a plastic tube, under pressure, in a direction perpendicular to the tube, against an elongated sinuous shaped die having transverse portions interconnected at their ends, and alternate longitudinal portions interconnecting pairs of transverse portions, inwardly of the interconnecting portions adjacent one side of said die, whereby to cut spaced transverse slots from the tube and forming fingers extending from one side of a backbone with the opposite ends of said fingers being severed and entering notches at the opposite sides of said backbone.

12. A method of making leaf binders comprising rolling a tube of plastic material, under pressure, in a direction at right angles to the tube, against a die having a longitudinal sinuous shaped blade having transverse portions interconnected at their ends and portions interconnecting spaced pairs of transverse portions adjacent one side of the blade, whereby to cut from said tube parallel spaced portions to form slots and fingers between said slots extending from one side of a backbone portion toward an opposite side of said backbone portion and with the outer ends of said fingers severed, and accomplishing said rolling of the tube with a rod inside the tube to support the tube during the die cutting action.

13. A method of making a leaf binder from a tube of plastic material comprising rolling a plastic tube, under pressure, in a direction perpendicular to the tube, against an elongated sinuous shaped die having transverse portions interconnected at their ends, and alternate longitudinal portions interconnecting pairs of transverse portions, inwardly of the interconnecting portions adjacent one side of said die, whereby to cut spaced transverse slots from the tube and forming fingers extending from one side of a backbone with the opposite ends of said fingers being severed and entering notches at the opposite sides of said backbone, and accomplishing said rolling of the tube with a rod inside the tube to support the tube during the die cutting action.

ALBERT GOMEZ.

REFERENCES CITED

The following references are of record in the file of this patent:

UNITED STATES PATENTS

| Number | Name | Date |
|---|---|---|
| 1,424,472 | Goldberg | Aug. 1, 1922 |
| 1,669,397 | Lindsay | May 8, 1928 |
| 1,934,660 | Fairchild | Nov. 7, 1933 |
| 2,335,710 | Townsend | Nov. 30, 1943 |
| 2,365,838 | Perkins | Dec. 26, 1944 |